D. E. MORRIS.
POWER TRANSMITTING MECHANISM.
APPLICATION FILED OCT. 17, 1911.
1,092,076.
Patented Mar. 31, 1914.
2 SHEETS—SHEET 1.
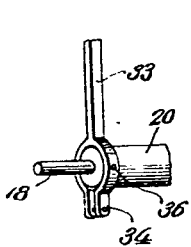
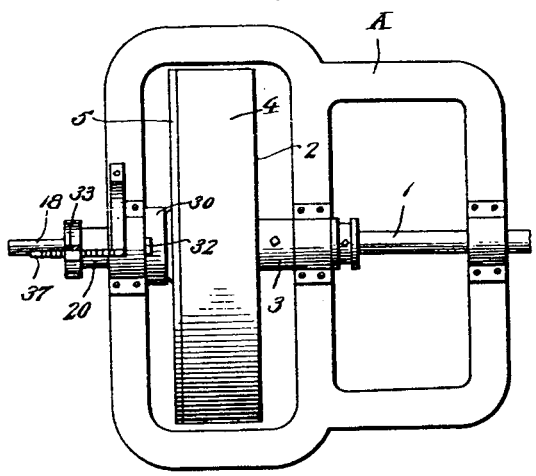
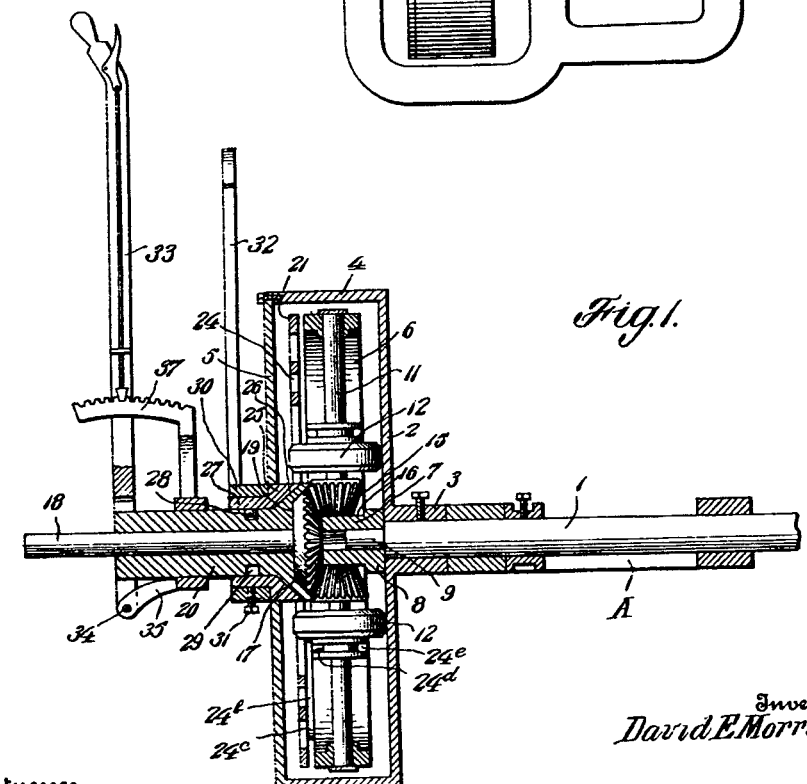
Inventor
David E. Morris,
Witnesses
J. H. Crawford
R. B. Cavanagh
By Victor J. Evans
Attorney

D. E. MORRIS.
POWER TRANSMITTING MECHANISM.
APPLICATION FILED OCT. 17, 1911.

1,092,076.

Patented Mar. 31, 1914.
2 SHEETS—SHEET 2.

Inventor
David E. Morris,

Witnesses
J. H. Crawford.
R. B. Cavanagh.

By Victor J. Evans
Attorney

UNITED STATES PATENT OFFICE.

DAVID E. MORRIS, OF GULFPORT, MISSISSIPPI.

POWER-TRANSMITTING MECHANISM.

1,092,076.

Specification of Letters Patent. Patented Mar. 31, 1914.

Application filed October 17, 1911. Serial No. 655,126.

*To all whom it may concern:*

Be it known that I, DAVID E. MORRIS, a citizen of the United States, residing at Gulfport, in the county of Harrison and State of Mississippi, have invented new and useful Improvements in Power-Transmitting Mechanism, of which the following is a specification.

The present invention relates to certain novel and useful improvements in power transmitting mechanism, and has particular application to a device of the class described wherein power is transmitted from a driving part to a driven part for any predetermined purpose, the invention also contemplating means whereby the direction of rotation of the device may be reversed, and whereby the speed may be varied.

In carrying out my invention, it is my purpose to provide a simple, compact, efficient and durable form of power transmitting mechanism, especially designed to be employed in connection with the balance or fly wheel of automobile or hydrocarbon engines, although I wish it to be understood that the invention is not limited in its useful application to this specific purpose, but may be employed in any other connection wherein its use is advantageous.

With the above-recited objects and others of a similar nature in view, my invention consists in the construction, combination and arrangement of parts, set forth in and falling within the scope of the appended claims.

Figure 3:
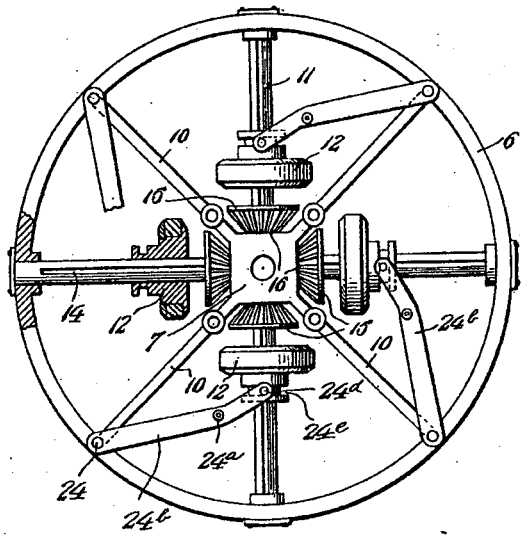
Figure 4:
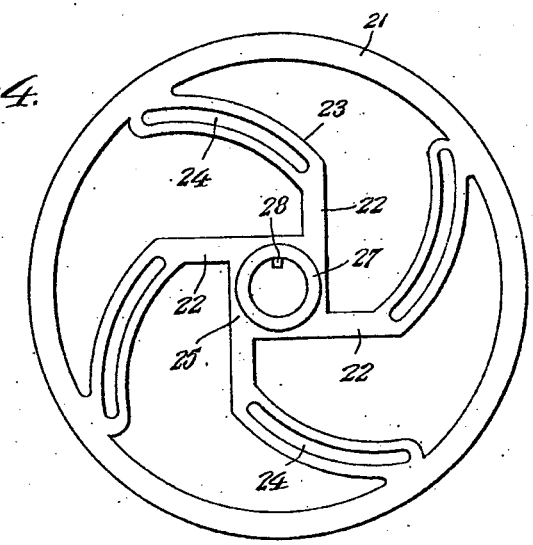

In the accompanying drawings:—Figure 1 is a vertical longitudinal sectional view taken through a power transmitting mechanism embodying my invention. Fig. 2 is a top plan view of the same. Fig. 3 is a view, partly in side elevation and partly in section, of the wheel member carrying the friction disks. Fig. 4 is a view in side elevation of the slotted wheel disk. Fig. 5 is a detail perspective view of a portion of the driven shaft and the sleeve therefor.

In the present instance, I have shown one preferred embodiment of my invention which is particularly adapted for use in connection with automobiles wherein a circular wheel or casing, in the nature of a fly wheel, is connected to the drive shaft, said wheel containing a laterally shiftable member non-rotatably mounted on the end of the drive shaft, said member carrying a series of radially movable friction disks designed to rotate the arms upon which they are mounted, said arms in turn carrying gear members meshing with and driving a gear on the driven shaft. Furthermore, I provide suitable operating means such as levers, by means of which the power transmitting mechanism may be shifted laterally from one side to the other of the fly wheel to control the direction of rotation of the driven shaft, certain of said levers being employed to move the friction disks to and from the center of the device to control or vary the speed of rotation of the driven shafts.

While I have herein shown and described my preferred form of mechanism, I wish it to be understood, however, that I do not limit myself to all the precise details of construction herein set forth by way of illustration, as modification and variation may be made without departing from the spirit of the invention or exceeding the scope of the appended claims.

Referring now to the accompanying drawings in detail, the letter A designates a suitable frame forming a bearing and support for the engine shaft or drive shaft 1, upon the end of which is mounted a hollow fly wheel comprising the side disk 2, having a hub member 3, by which it is secured to the shaft 1, and a lateral peripheral flange 4, the other side 5 of the wheel lying parallel with the side 2 and connected at its periphery with the flange 4 by bolts or other suitable means, said side 5 being capable of attachment and detachment, as desired. Within this casing is located a circular wheel-like member 6 having a hub portion 7, approximately square in cross section and terminating in the large circular end 8 into which projects the reduced end 9 of the driving shaft 1, said shaft end rotating in the hub. The member 6 is provided with suitable radially extending spokes 10 and is further provided with a series of radially extending rotatable arms 11, each arm carrying a friction disk 12, splined thereon for sliding movement as at 14, so that as hereinafter described, each arm is rotated by its disk but the disk is capable of the sliding movement thereon. At the end of each arm 11 is fast a beveled gear 15, having its lower end bearing against the adjacent flat face 16 of the squared end of the hub 7, these gear members meshing with and being adapted to drive the large beveled gear 17 splined on the end of the driven shaft 18 from which the power is taken for any suitable purpose. The gear 17 seats in the conical cupped end 19 of the sleeve 20 which surrounds the shaft 18.

The numeral 21 indicates a disk or plate provided with a series of angular radially extending arms 22, the curved portion 23 of each arm having an elongated segmental slot 24, adapted to receive the stud $24^a$ of the lever $24^b$ pivoted at $24^c$ to the rim of the member 6, the opposite end of said lever having a pin $24^d$ riding in a circular groove $24^e$ in the hub of the adjacent friction disk. The plate or disk 21 is provided with a hub 25 having an inwardly beveled face 26 fitting over the exterior face of the cupped end of the sleeve 20 the hub 25 having a collar 27 carrying a pin 28 working in the circular groove 29 in the sleeve 20.

The numeral 30 indicates a band fastened to the collar 27 by means of the bolts 31, said band carrying a lever 32. By this it will be seen that the lever may be thrown to rotate the collar of the hub of the plate and consequently the latter will be turned so that the levers $24^d$ connected to the segmental slots thereof may be shifted to move the friction disks radially toward and from the center of the device.

The numeral 33 indicates a lever for controlling the reverse movement of the device, that is, such lever shifts the mechanism in the fly wheel to and from one side or the other of said wheel, to bring the friction disks into contact with one or the other of the faces 2 and 5 of the fly wheel. This is accomplished as follows:—The lever 33 is fulcrumed at 34 to the bracket arm 35 suitably fastened to the frame A and is pinned as at 36 to the end of the sleeve 20, said lever being swung longitudinally of the quadrant 37 to shift the sleeve longitudinally on the shaft 18. In Fig. 1, the friction disks are shown in contact with the right hand side of the fly wheel. To reverse the direction of rotation of the shaft 18, the mechanism should be shifted to bring the disks into contact with the left hand side of the fly wheel and this would be accomplished by throwing the lever 33 toward the left in Fig. 1, or away from the fly wheel which would pull the sleeve toward the left on shaft 18, which in turn would draw the disk or plate 21, through the pin 28 carried by the collar of the hub of the disk, which pin, as stated, lies in the slot 29. As the plate or disk 21 is thus pulled toward the left side of the fly wheel, it, being connected to the member carrying the friction disks 12 and their coöperating parts, through the medium of the levers $24^b$ connected as heretofore described with the slotted arms 23, will draw the member 6 with the friction disks and gearing, to the left so that said disks contact with the wall or side 5 of the fly wheel. In the movement of the parts, the gear 17 is slid longitudinally of the shaft 18 and upon the end of such shaft, owing to the said gear being splined to the shaft and the lateral movement of the beveled gears 15.

In order to vary the speed of the driven shaft, the lever 32 is swung transversely or across the axis of the shaft, and through the collar 27 and its hub connection with the plate or disk 21, rotates the latter so that the pins $24^a$, being contacted with by the walls of the segmental slots 24 are pulled along said slots, moving the levers $24^b$ on their pivots $24^c$ thereby shifting the disk members 12 on their respective arms, inward or outward toward or from the center. If the speed of the shaft is to be increased, the disks are moved outward, and conversely are moved inward if it is desired to decrease the speed.

From the above description, taken in connection with the accompanying drawings, the construction and operation of my invention will be readily apparent to those skilled in the art.

It will be seen that I have provided an exceedingly simple yet efficient means for transmitting power from a drive shaft to a driven shaft, and for varying the speed of the latter, which mechanism is susceptible of many uses which need not be mentioned here in detail.

I claim:—

1. The combination with a drive shaft and a driven shaft, of a fly wheel mounted upon the driving shaft to rotate therewith, a member mounted within the fly wheel, frictional elements on said member, means for shifting said member laterally in the fly wheel to cause said frictional elements to engage with opposite sides of the wheel to reverse the direction of movement of the driven shaft, and means for shifting said frictional elements to vary the speed of said driven shaft.

2. The combination with a drive shaft and a driven shaft, of a fly wheel mounted upon the drive shaft and rotating therewith, a hub member stationary in the fly wheel and into which the end of the drive shaft extends, a member mounted to be shifted laterally upon said hub, a plurality of rotatably mounted radially movable friction disks carried by said member, drive gearing connecting the disks with the driven shaft, means for shifting the member and friction disks to opposite sides of the fly wheel.

3. The combination with a drive shaft and a driven shaft, of a fly wheel mounted upon the drive shaft and rotated therewith, a member mounted within the fly wheel, power transmitting means interposed between said member and the driven shaft, friction disks adapted to place the power transmitting means in driving operation, means for shifting the friction disks from one side of the fly wheel to the other, and means for shifting said friction disks to vary the speed of rotation of the driven shaft, said means including a disk plate member, movable connections between said plate member and the friction disks, and means for shifting the plate disk around its axis to move the friction disks radially relative to the sides of the fly wheel.

4. The combination with a drive shaft and a driven shaft, of a fly wheel rotating with the driving shaft, a circular member provided with a hub portion adapted to incase the end of the driving shaft, said hub being rotatable with the driving shaft, a series of radial arms rotatably mounted in said member, gearing carried at the inner end of each arm, a gear wheel on the driven shaft meshing with the gearing at the end of the arm, a friction disk slidable upon each of said arms, means for shifting the member from one side of the fly wheel to the other to place the disks in driving engagement with the sides of the fly wheel, and means for shifting said friction disks to vary the speed of the driven shaft, said means comprising a disk plate having segmental slots therein, levers pivoted to the circular member and provided with studs projecting into the slots in the disk plate the opposite ends of said levers engaging with the hubs of the friction disks, a rotatable hub member for said disk plate, and means for rotating the hub member to shift said plate and thereby move the disks radially relative to the axes of the shaft.

5. The combination with a drive shaft and a driven shaft, a fly wheel mounted upon the drive shaft and rotating therewith, power transmitting mechanism within the fly wheel for placing the same in driving engagement with the driven shaft, means for shifting said mechanism to reverse the direction of rotation of the driven shaft, and means for varying the speed of rotation of said driven shaft, said means including a member capable of partial rotation, means loosely connecting said member with the power transmitting mechanism, and mechanism for moving said partial rotatable member.

In testimony whereof I affix my signature in presence of two witnesses.

DAVID E. MORRIS.

Witnesses:
ROBT. H. HARRISON, Jr.,
RICHARD B. CAVANAGH.